US005151632A

United States Patent [19]

Troxell

[11] Patent Number: 5,151,632

[45] Date of Patent: Sep. 29, 1992

[54] FLAT PANEL EMISSIVE DISPLAY WITH REDUNDANT CIRCUIT

[75] Inventor: John R. Troxell, Sterling Heights, Mich.

[73] Assignee: General Motors Corporation, Detroit, Mich.

[21] Appl. No.: 673,611

[22] Filed: Mar. 22, 1991

[51] Int. Cl.[5] .......................... G09G 3/10; G02F 1/13

[52] U.S. Cl. .............................. 315/169.1; 315/169.3; 315/169.4; 340/781; 340/784; 359/54

[58] Field of Search ............... 315/169.1, 169.3, 169.4, 315/340; 340/784, 781, 782; 350/332; 359/54

[56] References Cited

U.S. PATENT DOCUMENTS

| | | | |
|---|---|---|---|
| 4,574,315 | 3/1986 | Yoshimura | 315/169.3 |
| 4,652,872 | 3/1987 | Fujita | 340/781 |
| 4,680,580 | 7/1987 | Kawahara | 340/784 |
| 4,686,426 | 8/1987 | Fujioka et al. | 315/169.3 |
| 4,820,222 | 4/1989 | Holmberg et al. | 445/340 |
| 4,845,489 | 7/1989 | Hormel | 340/811 |

OTHER PUBLICATIONS

Bisotto et al., "Using Redundancy When Designing Active-Matrix-Addressed LCDs", Proc. Soc. Inf. Display, vol. 26, pp. 201-207, 1985.

Castleberry et al., "A 1 Mega-Pixel Color a-Si TFT Liquid Crystal Display", Soc. Info. Display Int. Sympos. Digest, pp. 232-234, 1988.

Matsueda et al., "Defect-Free Active-Matrix LCD with Redundant Poly-Si TFT Circuit", Soc. Info. Display Int. Sympos. Digest, 238-241, 1989.

Nakajima et al., "A 9.5-in. Multicolor TFT-LCD Using a Defect-Tolerant Technology", Soc. Info. Display Int. Sympos. Digest, pp. 234-237, 1989.

Shlesinger & Myers Search Report dated Sep. 25, 1990 (P-1958-90).

*Primary Examiner*—Eugene R. LaRoche
*Assistant Examiner*—Michael B. Shingleton
*Attorney, Agent, or Firm*—Anthony Luke Simon

[57] ABSTRACT

A matrix addressable vacuum fluorescent display has redundant circuitry comprising a row electrode and two sets of column electrodes for each row and column of pixels, respectively, and two sets of FETs separately coupled to row and column electrodes to turn on the phosphor element for a given pixel, each set of FETs supplying part of the phosphor energizing current. If one column electrode or one set of transistors is defective the remaining set is effective to illuminate the phosphor at least to some suitable intensity.

1 Claim, 1 Drawing Sheet

FIG 1
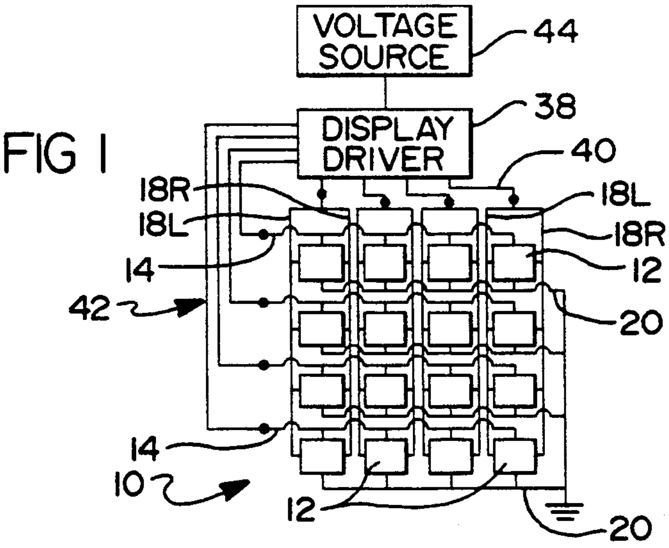
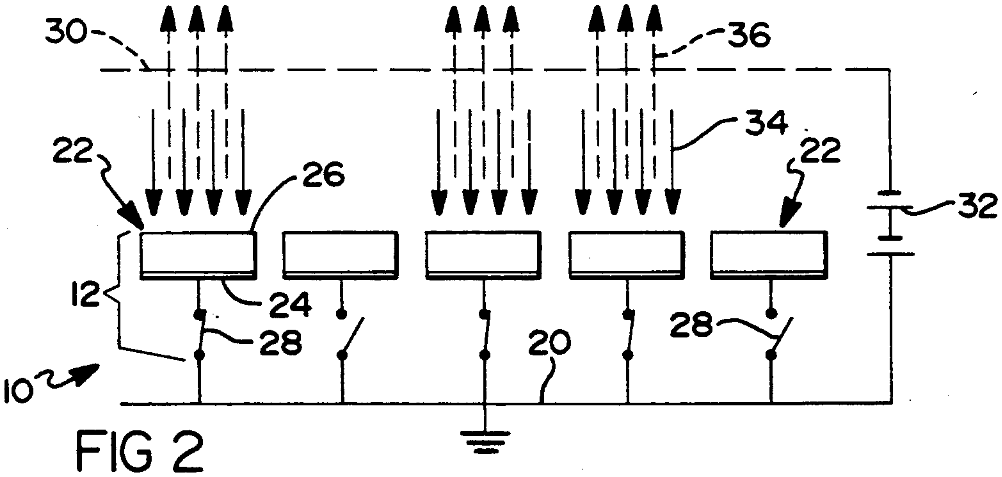
FIG 2
FIG 3
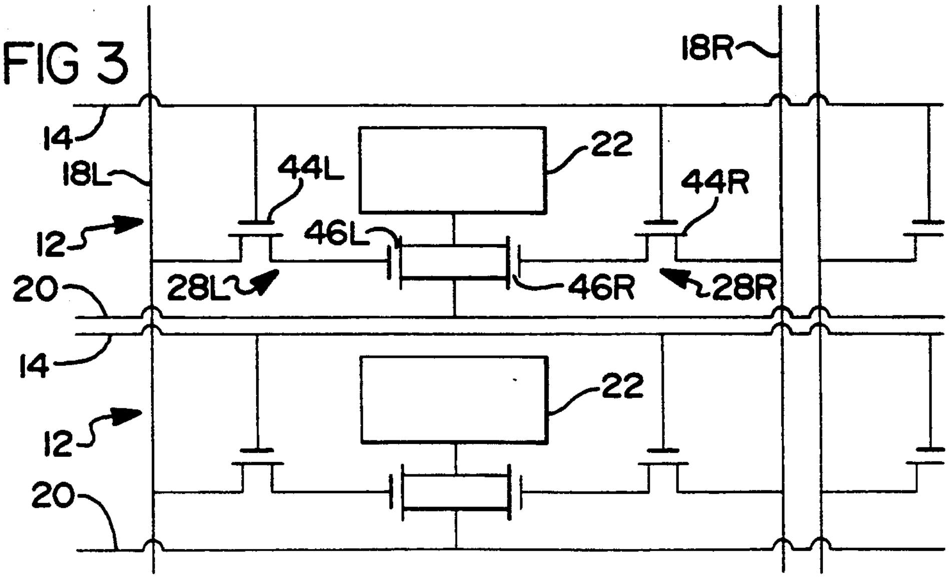

FLAT PANEL EMISSIVE DISPLAY WITH REDUNDANT CIRCUIT

FIELD OF THE INVENTION

This invention relates to pixel driving circuitry for an emissive display having redundancy to allow operation of each pixel when one part of the circuit is inoperative.

BACKGROUND OF THE INVENTION

During the fabrication of large area flat panel displays, defects sometimes occur which render a display unacceptable in appearance. Both inter-level shorts and open lines can result in pixels which cannot be turned on. The fabrication of crossing conductors, such as row and column electrodes, and of transistors involves applying an insulating layer over one conductor and then applying a second conductor over the insulation. Pinholes in the insulation are a cause of shorts between the two conductors. Normally, ground potential is maintained on the row electrodes except during the addressing of a specific row. A short of a column electrode to such a grounded row electrode at one location can cause the non-operation of a large number of pixels in the same column, due to the suppression of the column electrical signals. Of course, open column electrodes as well as shorted transistors can also cause loss of pixel operation. To minimize the number of rejected display panels due to such defects and raise the yield of the displays, it is desirable to provide redundant circuits which permit operation of a given pixel even though another circuit to that pixel is faulty.

One proposal for providing such a redundant circuit is set forth in U.S. Pat. No. 4,820,222 issued to Holmberg et al which suggests using two row electrodes for each row and two column electrodes for each column and dividing each pixel into four sub-pixels which are normally turned on and off at the same time and yet if one sub-pixel were inoperative some of the others would be able to function normally to minimize the effect of the fault on the appearance of the pixel. While this strategy may be useful for coarse displays, it does not apply to fine resolution displays. The proposal is equivalent to using four pixels to do the job of one. Since there is a practical limit to the density of phosphor elements comprising pixels, especially in high quality bright displays, the proposed sub-pixel scheme has a density limit of one fourth the normal pixel density limit. The circuitry in that patent is effective only for liquid crystal (field effect) display devices whereas emissive displays are current driven and thus require circuits for each pixel which are effective to sustain current so long as the pixel is to be illuminated.

SUMMARY OF THE INVENTION

It is therefore an object of the invention to provide a circuit for minimizing the effects of circuit faults in emissive displays without compromising display resolution.

The invention is carried out by a flat panel emissive display comprising: a matrix of pixels arranged in rows and columns, each pixel comprising means for emitting light when pixel current is applied thereto; a row electrode for each row of pixels; a plurality of column electrodes for each column of pixels, whereby each pixel has a corresponding row electrode and corresponding column electrodes; drive means for selectively energizing the row electrodes corresponding to selected rows of pixels and all of the column electrodes corresponding to selected columns of pixels; and redundant sets of transistor means coupled to each pixel for jointly supplying pixel current, each set of transistor means being connected to the corresponding row electrode and one of the corresponding column electrodes, whereby the pixel is activated by pixel current whenever any set of transistor means is activated by the electrodes connected thereto.

BRIEF DESCRIPTION OF THE DRAWINGS

The above and other advantages of the invention will become more apparent from the following description taken in conjunction with the accompanying drawings wherein like references refer to like parts and wherein:

FIG. 1 is schematic circuit of a flat panel display system according to the invention;

FIG. 2 is a schematic representation of a vacuum fluorescent display of the type used with this invention; and FIG. 3 is a detailed schematic circuit of a typical display pixel cell according to the invention.

DESCRIPTION OF THE INVENTION

The ensuing description is directed to a vacuum fluorescent display, however it will be recognized that the invention relates generally to emissive displays requiring a pixel current for pixel illumination. Several flat panel displays operate on the basis of converting electric current to light. These include vacuum fluorescent displays, thin film electroluminescent displays, and plasma displays. In these emissive displays, the light output is related to the electrical current supplied to a particular area of the display. By supplying this current from multiple drive transistors, a large degree of redundancy can be built into the product.

FIG. 1 shows a flat panel emissive display 10 having 16 active pixel cells 12 in a matrix of four rows and four columns. Address lines to the pixels comprise a row electrode 14 for each pixel row and a plurality of column electrodes (here two) 18L and 18R for each pixel column, one on each side of each column. (Reference numerals include suffixes L or R when the distinction between the left and right side of the cell is important but otherwise the suffixes may be omitted.) The column electrodes 18R and 18L are joined at one end or both ends to carry the same signal, and thus are essentially the same conductor. Ground lines 20 connect each active pixel cell 12 to ground. Each active pixel cell 12 is connected to a row electrode 14, each of the neighboring column electrodes 18L and 18R, and a ground line 20.

FIG. 2 illustrates the operation of a vacuum fluorescent display device 10. Each active pixel cell 12 includes a phosphor element 22 comprising an anode 24 covered with a phosphor 26 and a switch 28 for selectively connecting the anode to ground line 20. A cathode filament 30, which is held at a negative voltage by a voltage source 32 emits electrons 34 which are drawn to those phosphor elements 22 which are at ground potential. Light 36 is emitted from the phosphor 26 when it is struck by the electrons. The pattern of light emitted from the display is determined by selectively opening and closing the switches 28. The switches are controlled by suitably addressing the active cells 12 in the matrix.

Referring again to FIG. 1, a display driver 38, which may include a microprocessor based logic circuit, has column output lines 40, one connected to each pair of column electrodes 18R and 18L, and row output lines 42 connected to the row electrodes 14. A voltage source 44 provides the appropriate voltage for each output line.

FIG. 3 shows two active cells 12 in adjacent rows of the same column of a display and addressed by row electrodes 14 and column electrodes 18L and 18R. Each phosphor element is controlled by two switches 28L and 28R, each switch comprising a set of two MOS FETs. FET 44L is a select transistor which has a source connected to column electrode 18L and its gate connected to the row electrode 14. The drain of FET 44L is connected to the gate of the drive transistor 46L which has its drain and source connected between the phosphor element 22 and the ground line 20. The other switch 28R is configured the same as switch 28L and comprises select FET 44R controlled by row electrode 14 and column electrode 18R, and drive FET 46R which has its source and drain in parallel with that of FET 46L. During normal operation, for a pixel to be illuminated the row electrode 14 is energized and both column electrodes 18L and 18R are energized to turn on all the FETs. This permits both drive FETs 46 to carry pixel current between the phosphor element and ground. This normal current which is the sum of the currents in the drive FETs 46 is sufficient to illuminate the phosphor to its full brightness. In the event that a short in one of the column electrodes or in one of the FETs renders either of the switches 28R or 28L inoperative, the other switch will still conduct. Then the current will be only half as great and the light intensity will be less, but the apparent brightness is diminished only slightly, since the human eye has a logarithmic response to the light intensity.

The display uses a conventional addressing scheme in that the row electrodes 14 are momentarily energized one at a time and for each row selected column electrodes are energized to turn on the switches for given pixels in a row. The two FETs in each switch are used in a sample-and-hold configuration to maintain the current once a switch has been turned on. The current through the select FET 44 charges the gate of the drive FET 46, keeping FET 46 on until the charge is removed during a later addressing cycle. Thus the pixel current is on for a 100% duty cycle.

The FETs are designed to afford the necessary accumulation of charge on the gate of FET 46 and the required current through FET 46. For example, the transistors are p-channel polycrystalline silicon (polysilicon) thin film transistor devices and FET 44 has a channel length of 30 μm and a channel width of 10 μm. The drive transistors 46 have a channel length of 10 μm and channel width of 450 μm. The channel width of the drive FETs 46 is chosen to pass sufficient current to obtain the desired phosphor brightness when both FETs 46 are conducting. For these p-channel devices, the select FETs 44 are turned on by −20 volts applied to the corresponding row and column electrodes.

A number of material choices are available in the fabrication of the row electrodes 14 and column electrodes 18. Material choices affect the ease of processing and the resistance of the electrodes. It is preferred to use a metal such as aluminum for the row electrodes 14 and a resistive conductor such as heavily doped polysilicon (doped with either Boron or Phosphorus) for the column electrodes 18. The resistivity of aluminum is less than 1 ohm/square and of polysilicon which has been heavily doped with Boron or Phosphorus is about 100 ohms/square. Thin film strips used for electrodes are typically 30 μm wide, so that a one centimeter long polysilicon electrode has a resistance of about 33,000 ohms/cm. This high resistance is important to the operation of the column electrodes to localize the affects of a short to a grounded low electrode. On the other hand, if a metal or other low resistance material were used for the column electrodes 18, both electrodes 18R and 18L would be disabled by a single short to ground to nullify the benefit of the redundant circuit. However, some of the benefits of the redundancy could be obtained by low resistance column electrodes in the case of open column electrodes, wherein the redundant structure will enable the affected pixels to be illuminated at a reduced intensity.

The embodiments of the invention in which an exclusive property or privilege is claimed are defined as follows:

1. A flat panel emissive display comprising:

a matrix of pixels arranged in rows and columns, each pixel comprising means for emitting light when pixel current is applied thereto;

at least one row electrode of each row of pixels;

a plurality of column electrodes for each column of pixels, each pixel having at least one corresponding row electrode and a plurality of corresponding column electrodes, the plurality of column electrodes for each column of pixels comprising a single conductor with sufficient resistance to localize a short circuit condition of one of the column electrodes;

driver means for selectively energizing the row electrodes corresponding to selected rows of pixels and the pluralities of column electrodes corresponding to selected columns of pixels; and redundant sets of transistors means coupled to each pixel for jointly supplying pixel current, each set of transistor means being connected to at least the one row electrode and to one of the corresponding column electrodes such that each pixel is normally activated by signals from the one row electrode and at least one of the column electrodes.

* * * * *